United States Patent
Iwata et al.

(10) Patent No.: US 10,106,743 B2
(45) Date of Patent: Oct. 23, 2018

(54) FLAME RETARDANT RESIN COMPOSITION AND CABLE USING THE SAME

(71) Applicant: FUJIKURA LTD., Tokyo (JP)

(72) Inventors: Masayuki Iwata, Chiba (JP); Tomohisa Watanabe, Chiba (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 15/305,734

(22) PCT Filed: Apr. 22, 2015

(86) PCT No.: PCT/JP2015/062207
§ 371 (c)(1),
(2) Date: Oct. 21, 2016

(87) PCT Pub. No.: WO2015/178151
PCT Pub. Date: Nov. 26, 2015

(65) Prior Publication Data
US 2017/0051208 A1    Feb. 23, 2017

(30) Foreign Application Priority Data

May 23, 2014  (JP) ................. 2014-106653

(51) Int. Cl.
| | |
|---|---|
| C09K 21/02 | (2006.01) |
| C08L 23/08 | (2006.01) |
| C08L 23/06 | (2006.01) |
| C08L 53/00 | (2006.01) |
| H01B 3/44 | (2006.01) |
| H01B 3/46 | (2006.01) |
| C08L 83/04 | (2006.01) |
| H01B 7/295 | (2006.01) |
| G02B 6/44 | (2006.01) |
| C08L 23/02 | (2006.01) |
| C08K 3/26 | (2006.01) |
| C08K 3/34 | (2006.01) |
| C08K 5/098 | (2006.01) |
| C08K 5/3435 | (2006.01) |

(52) U.S. Cl.
CPC ............. *C09K 21/02* (2013.01); *C08K 3/26* (2013.01); *C08K 3/34* (2013.01); *C08K 5/098* (2013.01); *C08K 5/3435* (2013.01); *C08L 23/02* (2013.01); *C08L 23/06* (2013.01); *C08L 23/0815* (2013.01); *C08L 53/00* (2013.01); *C08L 83/04* (2013.01); *G02B 6/4436* (2013.01); *H01B 3/44* (2013.01); *H01B 3/441* (2013.01); *H01B 3/46* (2013.01); *H01B 7/295* (2013.01); *C08L 23/0869* (2013.01); *C08L 2201/02* (2013.01); *C08L 2201/08* (2013.01); *C08L 2203/202* (2013.01)

(58) Field of Classification Search
CPC combination set(s) only.
See application file for complete search history.

(56) References Cited

U.S. PATENT DOCUMENTS

| | | | |
|---|---|---|---|
| 2006/0269771 A1 | 11/2006 | Cogen et al. | |
| 2012/0184651 A1* | 7/2012 | Hurst | C08L 67/02 524/96 |

FOREIGN PATENT DOCUMENTS

| | | |
|---|---|---|
| CN | 102056979 A | 5/2011 |
| EP | 0 774 487 A1 | 5/1997 |
| EP | 0 774 488 A1 | 5/1997 |
| EP | 2 762 532 A1 | 8/2014 |
| EP | 2 772 516 A1 | 9/2014 |
| EP | 2 787 041 A1 | 10/2014 |
| EP | 2 751 203 B1 | 12/2015 |
| JP | 09-169918 A | 6/1997 |
| JP | 11-043568 A | 2/1999 |
| JP | 2001-011262 A | 1/2001 |
| JP | 2006-519895 A | 8/2006 |
| JP | 2013-108053 A | 6/2013 |
| TW | 201317330 A1 | 5/2013 |
| TW | 201323516 A1 | 6/2013 |
| TW | 201331293 A1 | 8/2013 |
| WO | 2009/146831 A1 | 12/2009 |
| WO | WO 2009/146831 A1 * | 12/2009 |

OTHER PUBLICATIONS

Taiwanese Office Action issued in TW 201610114 A dated Apr. 20, 2016.
International Search Report of PCT/JP2015/062207 dated Jul. 7, 2015.
Communication dated May 27, 2017, from the State Intellectual Property Office of the P.R.C., in counterpart Chinese application No. 201580008200.4.

\* cited by examiner

*Primary Examiner* — Robert D. Harlan
(74) *Attorney, Agent, or Firm* — Sughrue Mion, PLLC (57) ABSTRACT

Disclosed is a flame retardant resin composition in which relative to 100 parts by mass of the base resin, a silicone based compound is blended at a ratio of 0.1 to 10 parts by mass a fatty acid metal salt is blended at a ratio of 0.1 to 20 parts by mass, a flame retardant agent is blended at a ratio of 5 to 200 parts by mass, a hindered phenol based compound is blended at a ratio of 0.05 to 10 parts by mass, and a hindered amine based compound is blended at a ratio of 0.05 to 10 parts by mass. The hindered amine based compound has a group represented by the following formula (1).

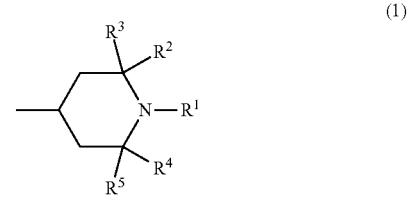

(1)

($R^1$ represents an alkyl or alkoxy group having 1 to 30 carbon atoms, and $R^2$ to $R^5$ each independently represent an alkyl group having 1 to 6 carbon atoms).

11 Claims, 3 Drawing Sheets

FLAME RETARDANT RESIN COMPOSITION AND CABLE USING THE SAME

CROSS REFERENCE TO RELATED APPLICATIONS

This application is a National Stage of International Application No. PCT/JP2015/062207 filed Apr. 22, 2015, claiming priority based on Japanese Patent Application No. 2014-106653 filed May 23, 2014, the contents of all of which are incorporated herein by reference in their entirety.

TECHNICAL FIELD

The present invention relates to a flame retardant resin composition and a cable using the same.

BACKGROUND ART

A so-called eco material is widely used for coating of a cable, a sheath of a cable, a tube, a tape, a wrapping material, a building material, or the like.

As such eco material, a composition obtained by adding calcium carbonate as a flame retardant agent, silicone oil or magnesium stearate as a flame retardant aid, an oxidation inhibitor or the like to a polyolefin resin is known (see, Patent Document 1 below).

CITATION LIST

Patent Document

Patent Document 1: JPH09-169918 A

SUMMARY OF THE INVENTION

Problem to be Solved by the Invention

However, the composition described in the above Patent Document 1 has a problem described below.

Namely, although the composition described in Patent Document 1 has excellent flame retardancy, there is a room for improvement in terms of weather resistance. For this reason, the cable obtained by using the above-mentioned composition is difficult to use as a cable for outdoor use.

For this reason, there is a need for a flame retardant resin composition which can improve weather resistance while securing excellent flame retardancy.

The invention is achieved under the circumstance described above, and an object of the invention is to provide a flame retardant resin composition which can improve weather resistance while securing excellent flame retardancy, and a cable using the composition.

Means for Solving Problem

In order to solve the problems described above, the present inventors conducted intensive studies. For example, to improve the weather resistance of a composition, the present inventors blended benzotriazole that is known as a photostabilizer. However, it was found that even when benzotriazole is blended, the weather resistance is not improved sufficiently and the flame retardancy is significantly deteriorated by blending benzotriazole. Thus, the present inventors tried to blend a hindered amine based compound instead of benzotriazole. If fatty acid is used as a fatty acid-containing compound for such case, a neutralization reaction may be caused between the fatty acid and a hindered amine based compound as a base, and there is a possibility that activity of the hindered amine based compound is inhibited. However, it has been believed that, if a metal salt of fatty acid such as magnesium stearate is used as a fatty acid-containing compound, such neutralization reaction does not occur, and the activity of the hindered amine based compound may not be inhibited. However, it was surprisingly found that even some of the hindered amine based compound cannot sufficiently improve the weather resistance and lowers the flame retardancy. Thus, the present inventors conducted further intensive studies and found that a specific group contained in the hindered amine based compound is very useful for solving the aforementioned problem. Thus, the present inventors have come to solve the above problems by the inventions described below.

Namely, the invention is a flame retardant resin composition containing a base resin which contains a polyolefin based compound, a silicone based compound, a fatty acid metal salt, a flame retardant agent consisting of at least one component selected from the group consisting of calcium carbonate particles and silicate compound particles, a hindered phenol based compound, and a hindered amine based compound, in which the silicone based compound is blended at a ratio of 0.1 part by mass or more and 10 parts by mass or less relative to 100 parts by mass of the base resin, the fatty acid metal salt is blended at a ratio of 0.1 part by mass or more and 20 parts by mass or less relative to 100 parts by mass of the base resin, the flame retardant agent is blended at a ratio of 5 parts by mass or more and 200 parts by mass or less relative to 100 parts by mass of the base resin, the hindered phenol based compound is blended at a ratio of 0.05 part by mass or more and 10 parts by mass or less relative to 100 parts by mass of the base resin, and the hindered amine based compound is blended at a ratio of 0.05 part by mass or more and 10 parts by mass or less relative to 100 parts by mass of the base resin, and the hindered amine based compound has a monovalent group represented by the following formula (1) or a divalent group represented by the following formula (2).

[Chem. 1]

(1)

(in the formula (1), $R^1$ represents an alkyl group or alkoxy group having 1 to 30 carbon atoms and $R^2$ to $R^5$ each independently represent an alkyl group having 1 to 6 carbon atoms)

[Chem. 2]

(2)

(in the formula (2), $R^6$ represents an alkylene group having 1 to 30 carbon atoms and $R^7$ to $R^{10}$ each independently represent an alkyl group having 1 to 6 carbon atoms).

According to the flame retardant resin composition of the invention, the weather resistance can be improved while securing excellent flame retardancy.

Furthermore, the present inventors assume as follows for the reason why excellent flame retardancy can be obtained with the flame retardant resin composition of the invention.

That is, the present inventors assume that, when calcium carbonate particles or calcium silicate particles, a silicone based compound, and a fatty acid metal salt are used, the flame retardant effect of the resin composition is enhanced since a surface barrier layer is formed at the time of combustion.

Furthermore, for the reason why weather resistance can be improved with the aforementioned flame retardant resin composition of the invention, the present inventors assume as follows, although the details remain unclear.

Namely, it is believed that the interaction between the fatty acid metal salt and the hindered amine based compound can be reduced by using, as the hindered amine based compound, a compound having a monovalent group represented by the above formula (1) or a divalent group represented by the above formula (2). In contrast, if $R^1$ is a hydrogen atom in the monovalent group represented by the above formula (1), the fatty acid metal salt and the hindered amine based compound can interact with each other more easily so that the intrinsic activity of the hindered amine based compound is lowered. Thus, the present inventors assume that the weather resistance of the flame retardant resin composition of the invention is improved.

In the flame retardant resin composition mentioned above, it is preferable that the silicone based compound be blended at a ratio of more than 0.2 part by mass relative to 100 parts by mass of the base resin, the fatty acid metal salt be blended at a ratio of more than 3 parts by mass relative to 100 parts by mass of the base resin, the hindered amine based compound be blended at a ratio of 0.05 part by mass or more and less than 1 part by mass relative to 100 parts by mass of the base resin, and the hindered amine based compound has a molecular weight of 1000 or more.

In this case, more excellent flame retardancy is obtained.

In the flame retardant resin composition, it is preferable that the hindered amine based compound has a molecular weight of 1000 or more.

In this case, more excellent weather resistance is obtained compared to a case in which the molecular weight is less than 1000.

Herein, it is preferable that the hindered amine based compound has a molecular weight of 3000 or less.

In this case, more excellent flame retardancy is obtained and at the same time the weather resistance can be improved more.

Herein, in the flame retardant resin composition, it is preferable that the silicone based compound be blended at a ratio of more than 1 part by mass relative to 100 parts by mass of the base resin, the hindered amine based compound have a monovalent group represented by the formula (1), and $R^1$ in the formula (1) represent the alkyl group.

In this case, more excellent flame retardancy is obtained.

The invention is also a cable having a sheath and a transmission medium provided on the inner side of the sheath and composed of a conductor or an optical fiber, in which the sheath consists of the aforementioned flame retardant resin composition.

In this case, as the sheath consists of the aforementioned flame retardant resin composition, and this flame retardant resin composition can improve the weather resistance while securing excellent flame retardancy, the cable of the invention is useful as a cable for outdoor use.

Furthermore, in the invention, the expression "molecular weight" means a value calculated from a calibration curve which is established by measuring retention time in gel permeation chromatography (GPC) and performing measurement of polystyrene as a standard sample.

Effect of the Invention

According to the invention, a flame retardant resin composition which can improve weather resistance while securing excellent flame retardancy, and a cable using the composition are provided.

MODE(S) FOR CARRYING OUT THE INVENTION

Hereinbelow, the embodiment of the invention is described in detail using FIG. 1 and FIG. 2.

[Cable]

Figure 1:
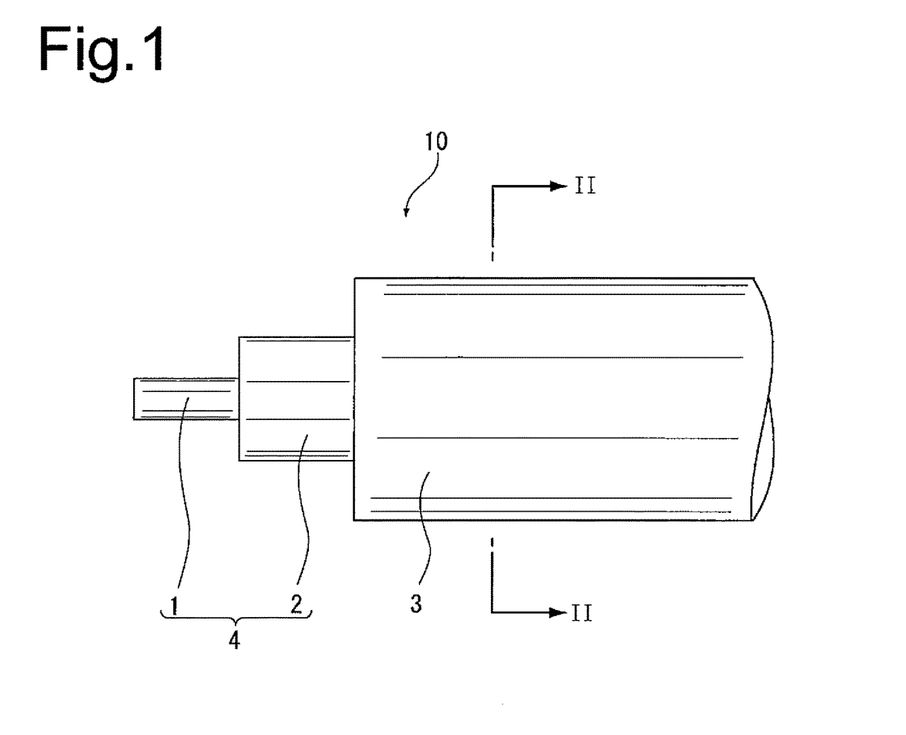
FIG. 1 is a partial side view illustrating an embodiment of a cable of the invention.
Figure 2:
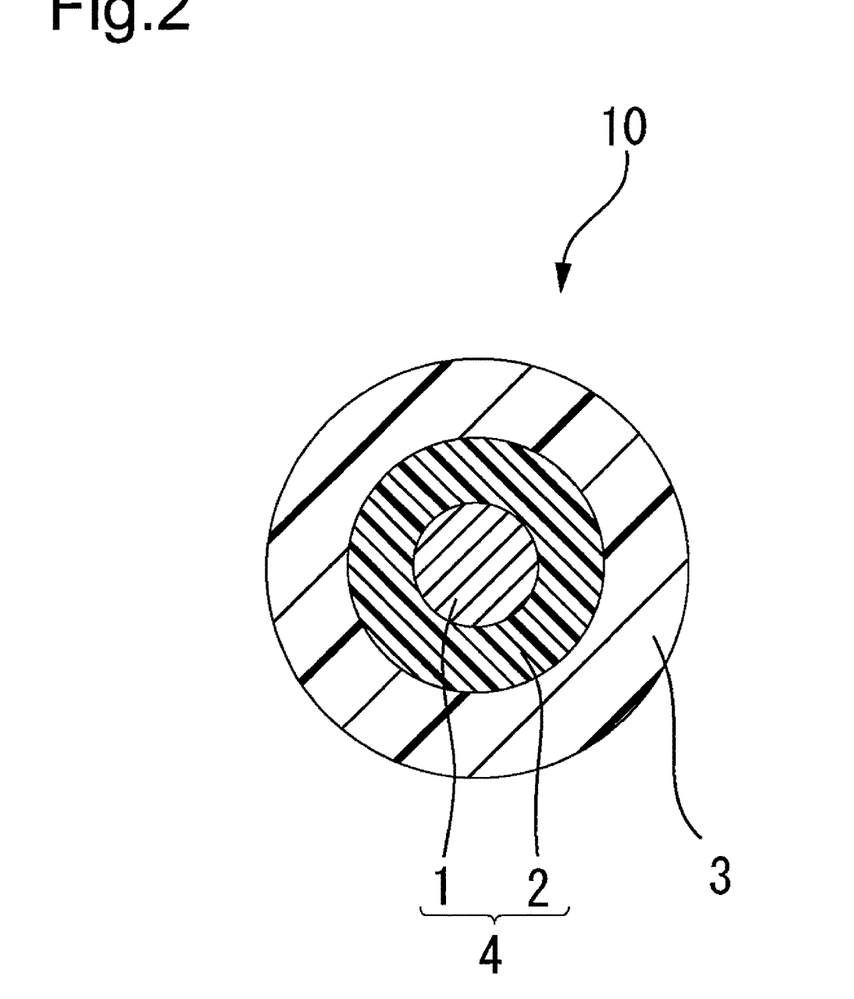
FIG. 2 is a cross-sectional view taken along the line II-II of FIG. 1.

FIG. 1 is a partial side view illustrating an embodiment of a cable according to the invention. FIG. 2 is a cross-sectional view taken along the II-II line of FIG. 1. As illustrated in FIG. 1 and FIG. 2, a cable 10 has an insulated wire 4 and a tube-shaped sheath 3 that covers the insulated wire 4. Examples of this cable 10 include a round cable. The insulated wire 4 has an internal conductor 1 as a transmission medium and a tube-shaped insulator 2 that covers the internal conductor 1. Namely, in the cable 10, the internal conductor 1 is provided on an inner side of the tube-shaped insulator 2 and also on an inner side of the tube-shaped sheath 3.

Herein, the tube-shaped insulator 2 and the sheath 3 are composed of a flame retardant resin composition, and the flame retardant resin composition contains a base resin containing a polyolefin based compound, a silicone based compound, a fatty acid metal salt, a flame retardant agent consisting of at least one kind selected from the group consisting of calcium carbonate particles and silicate compound particles, a hindered phenol based compound, and a hindered amine based compound. Herein, the silicone based compound is blended at a ratio of 0.1 part by mass or more and 10 parts by mass or less relative to 100 parts by mass of the base resin, the fatty acid metal salt is blended at a ratio of 0.1 part by mass or more and 20 parts by mass or less relative to 100 parts by mass of the base resin, the flame retardant agent is blended at a ratio of 5 parts by mass or more and 200 parts by mass or less relative to 100 parts by mass of the base resin, the hindered phenol based compound is blended at a ratio of 0.05 part by mass or more and 10 parts by mass or less relative to 100 parts by mass of the base resin, and the hindered amine based compound is blended at a ratio of 0.05 part by mass or more and 10 parts by mass or less relative to 100 parts by mass of the base resin.

Furthermore, the hindered amine based compound has a monovalent group represented by the following formula (1) or a divalent group represented by the following formula (2).

[Chem. 3]

(1)

(in the formula (1), $R^1$ represents an alkyl group or alkoxy group having 1 to 30 carbon atoms and $R^2$ to $R^5$ each independently represent an alkyl group having 1 to 6 carbon atoms).

[Chem. 4]

(2)

(in the formula (2), $R^6$ represents an alkylene group having 1 to 30 carbon atoms and $R^7$ to $R^{10}$ each independently represent an alkyl group having 1 to 6 carbon atoms).

The insulator 2 and the sheath 3 composed of the flame retardant resin composition can improve weather resistance while securing excellent flame retardancy. Accordingly, the cable 10 is useful as a cable for outdoor use.

[Method for Producing Cable]

Next, a method for producing the aforementioned cable 10 is described.

<Conductor>

First, the internal conductor 1 is prepared as a transmission medium. The internal conductor 1 may be composed of a single strand, or may be composed of plural strands that are bundled together. Furthermore, the internal conductor 1 is not particularly limited in terms of the diameter of the conductor, the material of the conductor and the like, and it can be appropriately selected in accordance with the use.

<Flame Retardant Resin Composition>

Meanwhile, the flame retardant resin composition is prepared. The flame retardant resin composition contains, as described above, a base resin containing a polyolefin based compound, a silicone based compound, a fatty acid metal salt, a flame retardant agent consisting of at least one kind selected from the group consisting of calcium carbonate particles and silicate compound particles, a hindered phenol based compound, and a hindered amine based compound.

(1) Base Resin

It is sufficient for the base resin to contain a polyolefin based compound. Examples of the polyolefin based compound include polyethylene (PE), ethylene based copolymer, polypropylene (PP), propylene based copolymer, modified polyolefin, and olefin based thermoplastic elastomer. These may be used either singly or in combination of two or more kinds thereof. Examples of the ethylene based copolymer include ethylene-ethyl acrylate copolymer (EEA), ethylene-methyl acrylate copolymer (EMA), ethylene vinyl acetate copolymer (EVA), ethylene-propylene copolymer, ethylene-butene copolymer, ethylene-hexene copolymer, and ethylene-octene copolymer. These may be used either singly or in combination of two or more kinds thereof. Examples of the propylene based copolymer include, for example, a block polypropylene copolymer and a random polypropylene copolymer.

The base resin may be a resin in which the polyolefin based compound and other resin are mixed. In this case, examples of the resin other than the polyolefin based compound include engineering plastics like styrene based thermoplastic elastomer ester such as styrene-butadiene rubber (SBR), hydrogenated SBR, andstyrene ethylene butylene styrene block copolymer (SEBS) and polycarbonate resin.

The content of the polyolefin based compound in the base resin is, although not particularly limited, preferably 30 to 100% by mass, and more preferably 50 to 100% by mass.

(2) Silicone Based Compound

The silicone based compound is a compound which functions as a flame retardant aid. Examples of the silicone based compound include polyorganosiloxanes. Here, the polyorganosiloxanes are compounds which have siloxane bonds in the main chain and have organic groups in side chains. Examples of the organic groups include, for example, a methyl group, a vinyl group, an ethyl group, a propyl group, and a phenyl group. Specific examples of the polyorganosiloxanes include dimethyl polysiloxane, methylethyl polysiloxane, methyloctyl polysiloxane, methylvinyl polysiloxane, methylphenyl polysiloxane, and methyl-(3,3,3-trifluoropropyl)polysiloxane. The polyorganosiloxane is used in the form of silicone oil, silicone powder, silicone gum, or silicone resin. Among them, the polyorganosiloxane is preferably used in the form of silicone gum. In this case, blooming does not easily occur.

As described above, the silicone based compound is blended at a ratio of 0.1 part by mass or more and 10 parts by mass or less relative to 100 parts by mass of the base resin. In this case, compared to a case in which the blending ratio of the silicone based compound is less than 0.1 part by mass, more excellent flame retardancy is obtained. Furthermore, as the blending ratio of the silicone based compound relative to 100 parts by mass of the base resin is within the above range, there is less non-uniformity in flame retardancy and weather resistance compared to a case in which the blending ratio of the silicone based compound is more than 10 parts by mass. This is because, as the silicone based compound can be more easily and uniformly mixed in the base resin, it is not likely that a lump partially occurs.

The blending ratio of the silicone based compound relative to 100 parts by mass of the base resin is preferably 1 part by mass or more. In this case, compared to a case in which the blending ratio of the silicone based compound is less than 1 part by mass, more excellent flame retardancy is obtained.

The silicone based compound may be attached in advance to a surface of the flame retardant agent. In this case, it is not likely to have a segregation of the silicon based compound in the flame retardant resin composition, and thus the uniformity in the property of the flame retardant resin composition is further improved.

Examples of a method of obtaining the silicone based compound attached to the surface of the flame retardant agent include a method in which the silicone based compound is added to the flame retardant agent to obtain a mixture, the mixture is dried at 40° C. to 75° C. for 10 minutes to 40 minutes, and the dried mixture is pulverized using a Henschel mixer, an atomizer or the like, for example.

(3) Fatty Acid Metal Salt

The fatty acid metal salt is a compound which functions as a flame retardant aid. Here, as the fatty acid, a fatty acid having 12 to 28 carbon atoms is used. Examples of such a fatty acid include lauric acid, myristic acid, palmitic acid, stearic acid, tuberculostearic acid, oleic acid, linoleic acid, arachidonic acid, behenic acid, and montanic acid. Among them, the fatty acid is preferably stearic acid or tuberculostearic acid. Stearic acid is particularly preferred. In this case, more excellent flame retardancy is obtained as compared to a case in which a fatty acid other than stearic acid or tuberculostearic acid is used.

Examples of the metal that constitutes a metal salt of the fatty acid include magnesium, calcium, zinc, and lead. The metal salt of the fatty acid is preferably magnesium stearate or calcium stearate. In this case, more excellent flame retardancy is obtained as compared to a case in which a fatty acid metal salt other than magnesium stearate and calcium stearate is used.

As described above, the fatty acid metal salt is blended at a ratio of 0.1 part by mass or more and 20 parts by mass or less relative to 100 parts by mass of the base resin. In this case, compared to a case in which the blending ratio of the fatty acid metal salt is less than 0.1 part by mass, more excellent flame retardancy is obtained. Furthermore, as the blending ratio of the fatty acid metal salt relative to 100 parts by mass of the base resin is within the above range, more excellent weather resistance is obtained compared to a case in which the blending ratio of the fatty acid metal salt is more than 20 parts by mass.

The blending ratio of the fatty acid metal salt relative to 100 parts by mass of the base resin is preferably more than 3 parts by mass. In this case, compared to a case in which the blending ratio of the fatty acid metal salt is 3 parts by mass or less relative to 100 parts by mass of the base resin, more excellent flame retardancy is obtained.

The fatty acid metal salt may be attached in advance to a surface of the flame retardant agent together with the silicone based compound. In this case, it is not likely to have a segregation of the silicon based compound and the fatty acid metal salt in the flame retardant resin composition, and thus the uniformity in the property of the flame retardant resin composition is further improved.

Examples of a method of attaching the silicone based compound and the fatty acid metal salt to the surface of the flame retardant agent include a method in which the silicone based compound and the fatty acid metal salt are added to the flame retardant agent and mixed to obtain a mixture, the mixture is dried at 40° C. to 75° C. for 10 minutes to 40 minutes, and the dried mixture is pulverized using a Henschel mixer, an atomizer or the like, for example.

(4) Flame Retardant Agent

The flame retardant agent consists of at least one kind selected from the group consisting of calcium carbonate particles and silicate compound particles. Accordingly, the flame retardant agent may consist only of calcium carbonate particles or silicate compound particles, or alternatively, it may consist of a mixture of them.

(Calcium Carbonate Particles)

Calcium carbonate particles may be any one of heavy calcium carbonate and light calcium carbonate.

(Silicate Compound Particles)

Silicate compound particles are particles formed from a silicate compound, and examples thereof include talc and clay. Herein, examples of the clay include kaolin clay, pyrophyllite clay, calcined clay obtained by calcining them, and modified clay surface-modified with a silane-based coupling agent or the like. These may be used either singly or in combination of two or more kinds thereof. Among them, kaolin clay is preferable. In this case, an advantage of having impurities with less content and less coloration is obtained.

The flame retardant agent is blended at a ratio of 5 parts by mass or more and 200 parts by mass or less relative to 100 parts by mass of the base resin. In this case, compared to a case in which the ratio of the flame retardant agent is less than 5 parts by mass relative to 100 parts by mass of the base resin, more excellent flame retardancy is obtained.

Furthermore, as the blending ratio of the flame retardant agent relative to 100 parts by mass of the base resin is within the above range, the mechanical property of the flame retardant composition can be improved more compared to a case in which the blending ratio of the flame retardant agent is more than 200 parts by mass relative to 100 parts by mass of the base resin.

Furthermore, the blending ratio of the flame retardant agent relative to 100 parts by mass of the base resin is preferably 10 parts by mass or more and 80 parts by mass or less, more preferably 30 parts by mass or more and 70 parts by mass or less, and particularly preferably 40 parts by mass or more and 60 parts by mass or less. When the blending ratio of the flame retardant agent relative to 100 parts by mass of the base resin is within the above range, compared to a case in which the blending ratio is not within each range described above, the mechanical property can be more sufficiently improved while sufficiently securing the flame retardancy of the flame retardant resin composition.

(5) Hindered Phenol Based Compound

The hindered phenol based compound indicates a compound which has, in the molecule, at least one monovalent group having a substituent group at the ortho position relative to a phenolic hydroxyl group represented by the following general formula (3).

[Chem. 5]

(3)

In the general formula (3), $R^{11}$ and $R^{12}$ each independently represent a hydrogen atom or an alkyl group, and at least one of $R^{11}$ and $R^{12}$ is an alkyl group having 1 to 6 carbon atoms.

Examples of the alkyl group represented by $R^{11}$ and $R^{12}$ include a group having 1 to 6 carbon atoms such as a methyl group, an ethyl group, a propyl group, a butyl group, or an amyl group. Among them, both $R^{11}$ and $R^{12}$ are preferably a bulky branched alkyl group such as a t-butyl group.

Specific examples of the hindered phenol based compound include pentaerythritol-tetrakis[3-(3,5-di-t-butyl-4-hydroxyphenyl) propionate], octadecyl-3-(3,5-di-t-butyl-4-hydroxyphenyl)propionate, 1,3,5-tris(3,5-di-t-butyl-4-hydroxybenzyl)-1,3,5-triazine-2,4,6-(1H,3H,5H)-trione, 4,4',4'-(1-methylpropanol-3-ylidene)tris(6-t-butyl-m- cresol), 6,6'-di-t-butyl-4,4'-butylidene-di-m-cresol, octadecyl-3-(3,5-di-t-butyl-4-hydroxyphenyl)propionate, 3,9-bis[2-[3-(3-t-butyl-4-hydroxy-5-methylphenyl)propionyloxy]-1,1-dimethylethyl]-2,4,8,10-tetraoxaspiro[5.5]undecane, and 1,3,5-tris(3,5-di-t-butyl-4-hydroxyphenylmethyl)-2,4,6-trimethylbenzene.

The hindered phenol based compound is blended at a ratio of 0.05 part by mass or more and 10 parts by mass or less relative to 100 parts by mass of the base resin.

In this case, compared to a case in which the ratio of the hindered phenol based compound is less than 0.05 part by mass relative to 100 parts by mass of the base resin, more excellent weather resistance is obtained. Furthermore, when the blending ratio of the hindered phenol based compound relative to 100 parts by mass of the base resin is within the above range, the mechanical property of the flame retardant resin composition can be improved more compared to a case in which the blending ratio of the hindered phenol based compound relative to 100 parts by mass of the base resin is more than 10 parts by mass.

Furthermore, the blending ratio of the hindered phenol based compound relative to 100 parts by mass of the base resin is preferably 0.1 part by mass or more and 3 parts by mass or less. When the blending ratio of the hindered phenol based compound relative to 100 parts by mass of the base resin is within the above range, compared to a case in which the blending ratio is not within each range described above, the mechanical property can be more sufficiently improved while sufficiently securing the flame retardancy of the flame retardant resin composition.

(6) Hindered Amine Based Compound

The hindered amine based compound indicates a compound which has, in the molecule, at least one monovalent group represented by the above formula (1) or divalent group represented by the above formula (2).

In the formula (1), $R^1$ represents an alkyl group or alkoxy group having 1 to 30 carbon atoms. Examples of the alkyl group include a methyl group, an ethyl group, a propyl group, a butoxy group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group, a pentacosyl group, a hexacosyl group, a heptacosyl group, an octacosyl group, a nonacosyl group, and a triacontyl group. Among them, the methyl group is preferred as the alkyl group.

Examples of the alkoxy group include a methoxy group, an ethoxy group, a propoxy group, a butoxy group, a pentyloxy group, a hexyloxy group, a heptyl oxy group, an octyloxy group, a nonyloxy group, a decyloxy group, a undecyloxy group, a dodecyloxy group, a tridecyl oxy group, a tetradecyl oxy group, a pentadecyl oxy group, a hexadecyl oxy group, a heptadecyl oxy group, an octadecyl oxy group, a nonadecyl oxy group, an icosyl oxy group, a henicosyl oxy group, a docosyl oxy group, a tricosyl oxy group, a tetracosyl oxy group, a pentacosyloxy group, a hexacosyl oxy group, a heptacosyloxy group, an octacosyl oxy group, a nonacosyl oxy group, and a triacontyloxy group.

In the formula (1), $R^2$ to $R^5$ each independently represent an alkyl group having 1 to 6 carbon atoms. Examples of the alkyl group which may be used include a methyl group, an ethyl group, a propyl group, a butoxy group, a pentyl group, and a hexyl group.

In the formula (2), $R^6$ represents an alkylene group having 1 to 30 carbon atoms. Examples of the alkylene group include a methylene group, an ethylene group, a propylene group, a butylene group, a pentylene group, a hexylene group, a heptylene group, an octylene group, a nonylene group, a decylene group, a undecylene group, a dodecylene group, a tridecylene group, a tetradecylene group, a pentadecylene group, a hexadecylene group, a heptadecylene group, an octadecylene group, a nonadecylene group, an icosylene group, a henicosylene group, a docosylene group, a tricosylene group, a tetracosylene group, a pentacosylene group, a hexacosylene group, a heptacosylene group, an octacosylene group, a nonacosylene group, and a triacontylene group. Among them, the ethylene group is preferred as the alkylene group.

In the formula (2), $R^7$ to $R^{10}$ each independently represent an alkyl group having 1 to 6 carbon atoms. As the alkyl group like this, the same alkyl group as those described for $R^2$ to $R^5$ can be used.

The molecular weight of the hindered amine based compound is preferably 1000 or more. In this case, more excellent weather resistance is obtained compared to a case in which the molecular weight is less than 1000. The molecular weight of the hindered amine based compound is more preferably 1600 or more. However, the molecular weight of the hindered amine based compound is preferably 3000 or less, more preferably 2100 or less, and particularly preferably 1900 or less.

Furthermore, when the molecular weight of the hindered amine based compound is 1000 or more, it is preferable that $R^1$ in the formula (1) and the formula (2) represent an alkyl group. In this case, more excellent weather resistance is obtained.

Specific examples of the hindered amine based compound include a reaction product of 1,2,3,4-butane tetracarboxylic acid and tetramethyl ester, 1,2,2,6,6-pentamethyl-4-piperidinol, and β,β,β',β'-tetramethyl-2,4,8,10-tetraoxaspiro[5.5]undecane-3,9-diethanol, bis(1,2,2,6,6-pentamethyl-4-piperidyl)sebacate, bis(1-undecanoxy-2,2,6,6-tetramethylpiperidin-4-yl)carbonate, 1,2,2,6,6-pentamethyl-4-piperidyl methacryalte, a reaction product of formaldehyde polycondensate, {2,4,6-trichloro-1,3,5-triazine[N,N'-bis(2,2,6,6-tetramethylpiperidin-4-yl)hexane-1,6-diyldiamine]morpholine polymer} and formic acid, a mixture of bis(1,2,2,6,6-pentamethyl-4-piperidyl)sebacate and methyl 1,2,2,6,6-pentamethyl-4-piperidylsebacate, and a reaction product of butane diacid and dimethyl ester and 4-hydroxy-2,2,6,6-tetramethyl-1-piperidine ethanol.

The hindered amine based compound is blended at a ratio of 0.05 part by mass or more and 10 parts by mass or less relative to 100 parts by mass of the base resin.

In this case, compared to a case in which the blending ratio of the hindered amine based compound is less than 0.05 part by mass relative to 100 parts by mass of the base resin, more excellent weather resistance is obtained. Furthermore, when the blending ratio of the hindered amine based compound relative to 100 parts by mass of the base resin is within the above range, the mechanical property of the flame retardant resin composition can be improved more compared to a case in which the blending ratio of the hindered amine based compound relative to 100 parts by mass of the base resin is more than 10 parts by mass.

Furthermore, the blending ratio of the hindered amine based compound relative to 100 parts by mass of the base resin is preferably 0.2 part by mass or more and 1 part by mass or less. When the blending ratio of the hindered amine based compound relative to 100 parts by mass of the base resin is within the above range, compared to a case in which the blending ratio is not within each range described above, the mechanical property can be more sufficiently improved while sufficiently securing the flame retardancy of the flame retardant resin composition.

Furthermore, it is preferable that the silicone based compound be blended at a ratio of more than 0.2 part by mass relative to 100 parts by mass of the base resin, the fatty acid metal salt be blended at a ratio of more than 3 parts by mass relative to 100 parts by mass of the base resin, and when the molecular weight of the hindered amine based compound be 1000 or more, the hindered amine based compound be blended at a ratio of 0.05 part by mass or more and less than 1 part by mass relative to 100 parts by mass of the base resin.

In this case, more excellent flame retardancy is obtained.

Herein, the molecular weight of the hindered amine based compound is preferably 1600 or more.

However, the molecular weight of the hindered amine based compound is preferably 3000 or less.

In this case, even more excellent flame retardancy is obtained and also the weather resistance can be improved more.

The molecular weight of the hindered amine based compound is more preferably 2100 or less, and particularly preferably 1900 or less.

Herein, it is preferable that the silicone based compound be blended at a ratio of more than 1 part by mass relative to 100 parts by mass of the base resin, the hindered amine based compound have a monovalent group represented by the formula (1), and $R^1$ in the formula (1) represent an alkyl group.

In this case, even more excellent flame retardancy is obtained.

Meanwhile, the aforementioned "alkyl group" includes not only a non-substituted alkyl group but also a substituted alkyl group. As the substituted alkyl group, groups obtained by replacing a hydrogen atom of the non-substituted alkyl group with a halogen atom such as chlorine can be used. Furthermore, the aforementioned "alkoxy group" includes not only a non-substituted alkoxy group but also a substituted alkoxy group. As the substituted alkoxy group, groups obtained by replacing a hydrogen atom of the non-substituted alkoxy group with a halogen atom such as chlorine can be used.

The flame retardant resin composition may further contain additives, as necessary. The additives are composed of a material which is different from the aforementioned base resin, the silicone based compound, the fatty acid metal salt, the flame retardant agent, the hindered phenol based compound, and the hindered amine based compound. Examples of the additives include an oxidation inhibitor, an ultraviolet ray deterioration inhibitor, a processing aid (lubricating agent), a coloring agent, and an anti-static agent. These may be used either singly or in combination of two or more kinds thereof. Herein, each of the oxidation inhibitor, the ultraviolet ray deterioration inhibitor, the processing aid, the coloring agent, and the anti-static agent means an additive which does not enhance the flame retardancy of the flame retardant resin composition when they are contained in the aforementioned flame retardant resin composition. Herein, the description "does not enhance the flame retardancy of the flame retardant resin composition" means that, when the flame retardant resin composition containing the oxidation inhibitor, the ultraviolet ray deterioration inhibitor, the processing aid, the coloring agent, or the anti-static agent is evaluated by a vertical flame propagation test for a single insulated wire which is used for evaluating the flame retardancy of the flame retardant compositions of Examples and Comparative Examples that are described below, the evaluation result is equivalent or less than the evaluation result of the flame retardancy for a flame retardant resin composition that is different only in terms of not containing any of the oxidation inhibitor, the ultraviolet ray deterioration inhibitor, the processing aid, the coloring agent, and the anti-static agent.

Examples of the oxidation inhibitor include phenol-based oxidation inhibitor, an amine-based oxidation inhibitor, a sulfur-based oxidation inhibitor, a phosphorus-based oxidation inhibitor, a hydrazine-based oxidation inhibitor, an amide-based oxidation inhibitor, phosphoric acid, and citric acid. These may be used either singly or in combination of two or more kinds thereof. Herein, the phenol-based oxidation inhibitor is particularly preferable as the oxidation inhibitor.

Examples of the ultraviolet ray deterioration inhibitor include a benzophenone-based ultraviolet ray deterioration inhibitor, a salicylate-based ultraviolet ray deterioration inhibitor, an acrylonitrile-based ultraviolet ray deterioration inhibitor, and a metal complex salt-based ultraviolet ray deterioration inhibitor. These may be used either singly or in combination of two or more kinds thereof.

Examples of the processing aid include a hydrocarbon-based processing aid, a fatty acid-based processing aid, a fatty acid amide-based processing aid, an ester-based processing aid, an alcohol-based processing aid, a metal soap, and wax. These may be used either singly or in combination of two or more kinds thereof. Herein, the hydrocarbon-based processing aid is particularly preferable as the processing aid.

Examples of the coloring agent include an inorganic pigment, an organic pigment, a dye, and carbon black. These may be used either singly or in combination of two or more kinds thereof. Herein, the inorganic pigment is particularly preferable as the coloring agent.

Examples of the inorganic pigment include a chromate, a ferrocyan compound, a sulfide, an oxide, a sulphate, a silicate, a carbonate, and a phosphate. These may be used either singly or in combination of two or more kinds thereof.

Examples of the organic pigment include an azo-based pigment, a phthalocyanine-based pigment, a vat dye-based pigment, a lake-based pigment for dyeing, a quinacridone-based pigment, and a dioxazine-based pigment. These may be used either singly or in combination of two or more kinds thereof.

Examples of the dye include an anthraquinone-based dye, an indigoid-based dye, and an azo-based dye. These may be used either singly or in combination of two or more kinds thereof.

Examples of the anti-static agent include a cationic active agent, an anionic active agent, a non-ionic active agent, and an amphoteric active agent. These may be used either singly or in combination of two or more kinds thereof. Herein, the cationic active agent is particularly preferred as the anti-static agent.

Examples of the cationic active agent include a primary amine salt, a tertiary amine salt, a quaternary ammonia compound, and a pyridine derivative. These may be used either singly or in combination of two or more kinds thereof.

Examples of the anionic active agent include sulfated oil, soap, sulfated ester oil, sulfated amide oil, sulfated ester, sulfonate, and phosphoric acid ester. These may be used either singly or in combination of two or more kinds thereof.

Examples of the non-ionic active agent include polyhydric alcohol fatty acid ester and ethylene oxide adduct. These may be used either singly or in combination of two or more kinds thereof.

Examples of the amphoteric active agent include a carboxylic acid derivative and an imidazoline derivative. These may be used either singly or in combination of two or more kinds thereof.

The blending amount of the additive relative to 100 parts by mass of the base resin is not particularly limited. However, the blending amount is more preferably 2 parts by mass or less, and particularly preferably less than 1 part by mass. However, the blending amount of the additive is preferably 0.1 part by mass or more relative to 100 parts by mass of the base resin.

The flame retardant resin composition can be obtained by kneading the base resin, the silicone based compound, the fatty acid metal salt, the flame retardant agent, the hindered phenol based compound, the hindered amine based compound, and the additive that is added as necessary. Kneading can be carried out by using, for example, a kneading device such as a Banbury mixer, a tumbler, a pressurized kneader, a kneader extruder, a twin screw extruder, or a mixing roll. At this time, from the viewpoint of improving the dispersion property of the silicone based compound, a master batch (MB) obtained by kneading a portion of the base resin and the silicone based compound may be kneaded with the remaining base resin, the fatty acid metal salt, the flame retardant agent, the hindered phenol based compound, the hindered amine based compound, and the additive that is added as necessary.

Next, the internal conductor 1 is covered with the flame retardant resin composition. Specifically, the flame retardant resin composition described above is melt kneaded by using an extruder, and a tube-shaped extrusion product is formed. Then, this tube-shaped extrusion product is continuously covered on the internal conductor 1. Thus, the insulated wire 4 is obtained.

<Sheath>

Finally, one insulated wire 4 obtained as described above is prepared, and this insulated wire 4 is covered with the sheath 3 which has been produced by using the flame retardant resin composition described above. The sheath 3 is a so-called sheath and protects the insulator 2 from physical or chemical damage.

Thus, the cable 10 is obtained.

The invention is not limited to the embodiment described above. For example, in the above embodiment, the cable 10 has one insulated wire 4. However, the cable of the invention may have two or more insulated wires 4 on the inner side of the sheath 3. Furthermore, a resin section formed of polypropylene or the like may also be provided between the sheath 3 and the insulated wire 4.

Furthermore, in the above embodiment, the insulator 2 and the sheath 3 of the insulated wire 4 are formed of the flame retardant resin composition, but it is also possible that the insulator 2 is formed of a typical insulating resin, and only the sheath 3 is formed of the flame retardant resin composition that constitutes the insulator 2. Furthermore, the insulator 2 is not necessarily required, and can be omitted.

Figure 3:
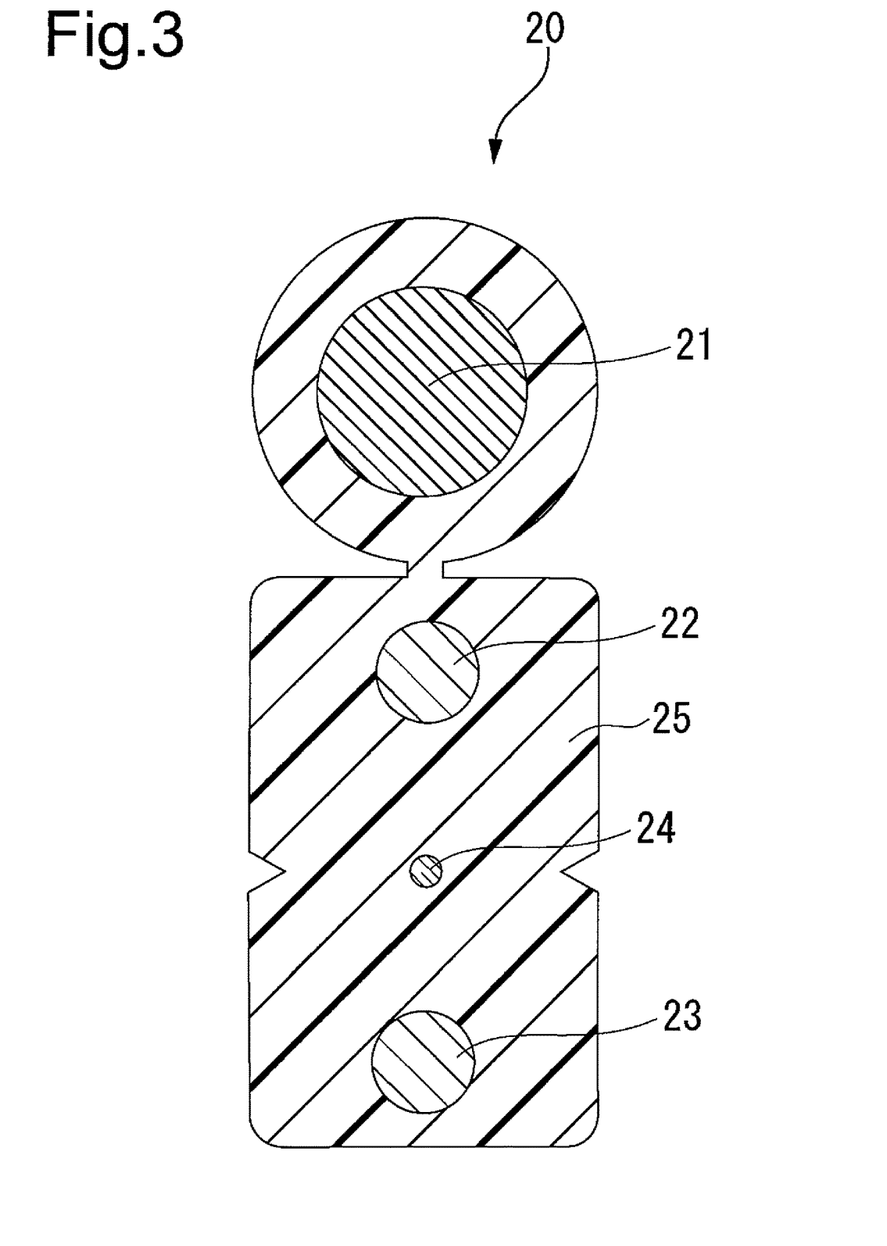
FIG. 3 is a cross-sectional view illustrating another embodiment of the cable of the invention.

Furthermore, the flame retardant resin composition for forming the insulator 2 and the sheath 3 of the insulated wire 4 in the aforementioned embodiment can be also applied to a sheath which covers an optical fiber of an optical fiber cable. For example, FIG. 3 is a cross-sectional view illustrating a drop type optical fiber cable which is given as an example of an optical fiber cable. As illustrated in FIG. 3, an optical fiber cable 20 is provided with a supporting line 21, two tension members 22 and 23, an optical fiber 24, and a sheath 25 for covering them. Herein, the sheath 25 is composed of the flame retardant resin composition which constitutes the insulator 2 and the sheath 3 of the insulated wire 4 in the above embodiment.

EXAMPLES

Hereinbelow, the contents of the invention are more specifically described by way of Examples and Comparative Examples, but the invention is not limited to the following Examples.

Examples 1 to 38 and Comparative Examples 1 to 17

A base resin, a silicone master batch (silicone MB), silicone, a fatty acid metal salt, a flame retardant agent, a hindered phenol based compound, and a hindered amine based compound or benzotriazole were blended in the blending amounts indicated in Tables 1 to 5, and they were kneaded for 15 minutes at 160° C. by a Banbury mixer. Thus, a flame retardant resin composition was obtained. Meanwhile, in Tables 1 to 5, the unit of the blending amount of each blended component is part (s) by mass. Furthermore, although Examples and Comparative Examples in which the blending amount of the base resin is not 100 parts by mass are present in Tables 1 to 5, a part of the base resin is also included in the silicone MB in those Examples and Comparative Examples, and thus the sum of the blending amount of the base resin and the blending amount of the base resin in the silicone MB is 100 parts by mass.

As the specific base resin, the silicone MB, silicone, the fatty acid metal salt, the flame retardant agent, the hindered phenol based compound, the hindered amine based compound, and benzotriazole, those described below were used.

(A) Base Resin
(A-1) Polyethylene (PE1)
LLDPE, EXCELLEN GMH GH030 (trade name, manufactured by Sumitomo Chemical Company, Limited)
(A-2) Polyethylene (PE2)
LLDPE, EvolueSP9018 (trade name, manufactured by Prime Polymer Co., Ltd.)
(A-3) Polyethylene (PE3)
LDPE, C150 (trade name, manufactured by UBE-MARUZEN POLYETHYLENE)
(A-4) Ethylene Based Copolymer 1
ethylene-butene based copolymer, TAFMER DF940 (trade name, manufactured by Mitsui Chemicals, Inc.)
(A-5) Ethylene Based Copolymer 2
ethylene ethylacrylate copolymer (EEA), A1150 (trade name, manufactured by Japan Polyethylene Corporation)
(A-6) Ethylene Based Copolymer 3
ethylene vinylacetate copolymer (EVA), EV460 (trade name, manufactured by DU PONT-MITSUI POLYCHEMICALS)
(A-7) Modified Polyolefin
maleic acid modified polyethylene (m-PE), TAFMER MA8510 (trade name, manufactured by Mitsui Chemicals, Inc.)
(A-8) Polypropylene (PP)
block PP, E-150GK (trade name, manufactured by Prime Polymer Co., Ltd.)

(A-9) Styrene Based Thermoplastic Elastomer 1
hydrogenated styrene-butadiene rubber (hydrogenated SBR), DYNARON 1320P (trade name, manufactured by JSR Corporation)
(A-10) Styrene Based Thermoplastic Elastomer 2
styrene-ethylene-ethylene-propylene-styrene copolymer (SEEPS), SEPTON 4033 (trade name, manufactured by KURARAY CO., LTD.)
  (B) Silicone MB
(B-1) Silicone MB1
X-22-2125H (trade name, manufactured by Shin-Etsu Chemical Co., Ltd.)
Containing 50% by mass of silicone gum (dimethyl polysiloxane) and 50% by mass of PE
(B-2) Silicone MB2
X-22-2101 (trade name, manufactured by Shin-Etsu Chemical Co., Ltd.)
Containing 50% by mass of silicone gum (dimethyl polysiloxane) and 50% by mass of PP
  (C) Silicone oil
ELEMENT 14 PDMS 5K-J (trade name, manufactured by Momentive)
  (D) Fatty Acid Metal Salt
(D-1) Fatty Acid Metal Salt 1
magnesium stearate, AFCO CHEM MGS (trade name, manufactured by ADEKA CORPORATION)
(D-2) Fatty Acid Metal Salt 2
calcium stearate, SC-P (trade name, manufactured by Sakai Chemical Industry Co., Ltd.)
  (E) Flame retardant agent
(E-1) Calcium Carbonate Particles
NCC-P (trade name, manufactured by Nitto Funka Kogyo K.K.)
(E-2) Silicate Compound Particles
talc particles, NANO ACE D-1000 (trade name, manufactured by Nippon Talc, Co., Ltd.), average particle diameter of 1.0 μm
  (F) Hindered Phenol Based Compound
(F-1) Hindered Phenol a
IRGANOX1010 (trade name, manufactured by BASF)
  (G) Hindered Amine Based Compound
(G-1) Hindered Amine a
CYASORB UV-3529 (trade name, manufactured by Cytec Industries Inc., N-alkyl type, molecular weight: 1700±10%
(G-2) Hindered Amine B
ADK STAB LA-63P (trade name, manufactured by ADEKA CORPORATION, N-alkyl type, molecular weight: about 2000
(G-3) Hindered Amine C
TINUVIN 622SF (trade name, manufactured by BASF, N-alkylene type, molecular weight: 3100 to 4000)
(G-4) Hindered Amine D
LA-81 (trade name, manufactured by ADEKA CORPORATION, N-alkoxy type, molecular weight: 681)
(G-5) Hindered Amine E
TINUVIN 765 (trade name, manufactured by BASF, N-alkyl type, molecular weight: 509)
(G-6) Hindered Amine F
CHIMASSORB 2020FDL (trade name, manufactured by BASF, N—H type, molecular weight: 2600 to 3400).

Furthermore, the "N-alkyl type" means a hindered amine based compound in which $R^1$ in the formula (1) is an alkyl group, the "N-alkoxy type" means a hindered amine based compound in which $R^1$ in the formula (1) is an alkoxy group, the "N—H type" means a hindered amine based compound in which $R^1$ in the formula (1) is a hydrogen atom, and the "N-alkylene type" means a compound which has a divalent group represented by the formula (2).

(H) Benzotriazole
TINUVIN 234 (trade name, manufactured by BASF, benzotriazole based ultraviolet absorbing agent, molecular weight: 447)

Subsequently, the flame retardant resin composition was kneaded for 15 minutes at 160° C. by using a Banbury mixer. Thereafter, this flame retardant resin composition was fed into a single screw extruder (L/D=20, screw type: full flight screw, manufactured by Marth Seiki CO., LTD.), and a tube-shaped extrusion product was extruded from the extruder and coated on a conductor (number of strands: one/cross-sectional area: 2 mm²) to have a thickness of 0.7 mm. Thus, an insulated wire was obtained.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Composition | Base resin | PE1 | 97 | 95 | 97 | 99.8 | 99.5 | 98.5 | 90 | 97 | 97 |
| | Silicone MB | Silicone MB1 | 6 | 10 | 6 | 0.4 | 1 | 3 | 20 | 6 | 6 |
| | Fatty acid metal salt | Fatty acid metal salt 1 | 5 | 10 | 5 | 5 | 5 | 5 | 5 | 1 | 3 |
| | Flame retardant agent | Calcium carbonate particles | 50 | 50 | | 50 | 50 | 50 | 50 | 50 | 50 |
| | | Silicate compound particles | | | 50 | | | | | | |
| | Hindered phenol | Hindered phenol A | 0.2 | 0.2 | 0.2 | 0.2 | 0.2 | 0.2 | 0.2 | 0.2 | 0.2 |
| | Hindered amine | Hindered amine A (N-alkyl type) | 0.5 | 0.5 | 0.5 | 0.5 | 0.5 | 0.5 | 0.5 | 0.5 | 0.5 |
| | | Hindered amine B (N-alkyl type) | | | | | | | | | |
| | | Hindered amine C (N-alkylene type) | | | | | | | | | |
| | | Hindered amine D (N-alkoxy type) | | | | | | | | | |
| Property | Weather resistance | Retention of tensile elongation (%) after UV irradiation for 100 h | 100 | 97 | 97 | 99 | 99 | 99 | 99 | 100 | 97 |
| | Flame retardancy | Combustion test (horizontal combustion) | ○ | ○ | ○ | ○ | ○ | ○ | ○ | ○ | ○ |
| | | Combustion test (60° inclined combustion) | ○ | ○ | ○ | X | ○ | ○ | ○ | X | ○ |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
|  | Combustion test (vertical flame propagation combustion) | ○ | ○ | ○ | X | X | ○ | ○ | X | X |

TABLE 2

| | | | Example 10 | Example 11 | Example 12 | Example 13 | Example 14 | Example 15 | Example 16 | Example 17 | Example 18 |
|---|---|---|---|---|---|---|---|---|---|---|---|
| Composition | Base resin | PE1 | 97 | 97 | 97 | 97 | 97 | 97 | 97 | 97 | 97 |
| | Silicone MB | Silicone MB1 | 6 | 6 | 6 | 6 | 6 | 6 | 6 | 6 | 6 |
| | Fatty acid metal salt | Fatty acid metal salt 1 | 20 | 5 | 5 | 5 | 5 | 5 | 3 | 5 | 5 |
| | Flame retardant agent | Calcium carbonate particles | 50 | 5 | 200 | 50 | 50 | 50 | 50 | 50 | 50 |
| | | Silicate compound particles | | | | | | | | | |
| | Hindered phenol | Hindered phenol A | 0.2 | 0.2 | 0.2 | 0.05 | 10 | 0.2 | 0.2 | 0.2 | 0.2 |
| | Hindered amine | Hindered amine A (N-alkyl type) | 0.5 | 0.5 | 0.5 | 0.1 | 10 | | | | |
| | | Hindered amine B (N-alkyl type) | | | | | | 0.5 | 0.5 | 1 | |
| | | Hindered amine C (N-alkylene type) | | | | | | | | | 0.5 |
| | | Hindered amine D (N-alkoxy type) | | | | | | | | | |
| Property | Weather resistance | Retention of tensile elongation (%) after UV irradiation for 100 h | 81 | 95 | 90 | 53 | 100 | 99 | 100 | 99 | 82 |
| | Flame retardancy | Combustion test (horizontal combustion) | ○ | ○ | ○ | ○ | ○ | ○ | ○ | ○ | ○ |
| | | Combustion test (60° inclined combustion) | ○ | ○ | ○ | ○ | ○ | ○ | ○ | ○ | ○ |
| | | Combustion test (vertical flame propagation combustion) | ○ | ○ | ○ | ○ | ○ | ○ | X | ○ | X |

TABLE 3

| | | | Example 19 | Example 20 | Example 21 | Example 22 | Example 23 | Example 24 | Example 25 | Example 26 |
|---|---|---|---|---|---|---|---|---|---|---|
| Composition | Base resin | PE1 | 97 | 97 | 97 | 97 | 97 | 97 | 97 | 97 |
| | Silicone MB | Silicone MB1 | 6 | 6 | 6 | 6 | 6 | 6 | 6 | 6 |
| | Fatty acid metal salt | Fatty acid metal salt 1 | 3 | 5 | 5 | 3 | 5 | 5 | 3 | 5 |
| | Flame retardant agent | Calcium carbonate particles | 50 | 50 | 50 | 50 | 50 | 50 | 50 | 50 |
| | Hindered phenol | Hindered phenol A | 0.2 | 0.2 | 0.2 | 0.2 | 0.2 | 0.2 | 0.2 | 0.2 |
| | Hindered amine | Hindered amine A (N-alkyl type) | | | | | | | | |
| | | Hindered amine B (N-alkyl type) | | | | | | | | |
| | | Hindered amine C (N-alkylene type) | 0.5 | 1 | | | | | | |
| | | Hindered amine D (N-alkoxy type) | | | 0.5 | 0.5 | 1 | | | |
| | | Hindered amine E (N-alkyl type) | | | | | | 0.5 | 0.5 | 1 |
| Property | Weather resistance | Retention of tensile elongation (%) after UV irradiation for 100 h | 90 | 95 | 80 | 85 | 89 | 79 | 86 | 89 |
| | Flame retardancy | Combustion test (horizontal combustion) | ○ | ○ | ○ | ○ | ○ | ○ | ○ | ○ |
| | | Combustion test (60° inclined combustion) | X | X | ○ | X | X | X | X | X |
| | | Combustion test (vertical flame propagation combustion) | X | X | X | X | X | X | X | X |

TABLE 4

| | | | Example 27 | Example 28 | Example 29 | Example 30 | Example 31 | Example 32 |
|---|---|---|---|---|---|---|---|---|
| Composition | Base resin | PE1 | 87 | 87 | 67 | | 67 | |
| | | PE2 | | | 30 | | | |
| | | PE3 | | | | 97 | | |
| | | Ethylene based copolymer 1 | | | | | 30 | |
| | | Ethylene based copolymer 2 | | | | | | 97 |
| | | Ethylene based copolymer 3 | | | | | | |
| | | Modified polyolefin | 10 | 10 | | | | |
| | | PP | | | | | | |
| | | Styrene based thermoplastic elastomer 1 | | | | | | |
| | | Styrene based thermoplastic elastomer 2 | | | | | | |
| | Silicone MB | Silicone MB1 | 6 | 6 | 6 | 6 | 6 | 6 |
| | | Silicone MB2 | | | | | | |
| | Silicone | Silicone oil | | | | | | |
| | Fatty acid metal salt | Fatty acid metal salt 1 | 5 | 5 | 5 | 5 | 5 | 5 |
| | | Fatty acid metal salt 2 | | | | | | |
| | Flame retardant agent | Calcium carbonate particles | 50 | | 50 | 50 | 50 | 50 |
| | | Silicate compound particles | | 50 | | | | |
| | Hindered phenol | Hindered phenol A | 0.2 | 0.2 | 0.2 | 0.2 | 0.2 | 0.2 |
| | Hindered amine | Hindered amine A (N-alkyl type) | 0.5 | 0.5 | 0.5 | 0.5 | 0.5 | 0.5 |
| Property | Weather resistance | Retention of tensile elongation (%) after UV irradiation for 100 h | 98 | 100 | 98 | 97 | 98 | 94 |
| | Flame retardancy | Combustion test (horizontal combustion) | ○ | ○ | ○ | ○ | ○ | ○ |
| | | Combustion test (60° inclined combustion) | ○ | ○ | ○ | ○ | ○ | ○ |
| | | Combustion test (vertical flame propagation combustion) | ○ | ○ | ○ | ○ | ○ | ○ |

| | | | Example 33 | Example 34 | Example 35 | Example 36 | Example 37 | Example 38 |
|---|---|---|---|---|---|---|---|---|
| Composition | Base resin | PE1 | 77 | | | | 100 | 97 |
| | | PE2 | | | | | | |
| | | PE3 | | | | | | |
| | | Ethylene based copolymer 1 | | | | | | |
| | | Ethylene based copolymer 2 | | | | | | |
| | | Ethylene based copolymer 3 | 20 | | | | | |
| | | Modified polyolefin | | | | | | |
| | | PP | | 97 | 67 | 67 | | |
| | | Styrene based thermoplastic elastomer 1 | | | 30 | | | |
| | | Styrene based thermoplastic elastomer 2 | | | | 30 | | |
| | Silicone MB | Silicone MB1 | 6 | | | | | 6 |
| | | Silicone MB2 | | 6 | 6 | 6 | | |
| | Silicone | Silicone oil | | | | | 3 | |
| | Fatty acid metal salt | Fatty acid metal salt 1 | 5 | 5 | 5 | 5 | 5 | |
| | | Fatty acid metal salt 2 | | | | | | 5 |
| | Flame retardant agent | Calcium carbonate particles | 50 | 50 | 50 | 50 | 50 | 50 |
| | | Silicate compound particles | | | | | | |
| | Hindered phenol | Hindered phenol A | 0.2 | 0.2 | 0.2 | 0.2 | 0.2 | 0.2 |
| | Hindered amine | Hindered amine A (N-alkyl type) | 0.5 | 0.5 | 0.5 | 0.5 | 0.5 | 0.5 |
| Property | Weather resistance | Retention of tensile elongation (%) after UV irradiation for 100 h | 95 | 96 | 96 | 97 | 97 | 95 |
| | Flame retardancy | Combustion test (horizontal combustion) | ○ | ○ | ○ | ○ | ○ | ○ |
| | | Combustion test (60° inclined combustion) | ○ | ○ | ○ | ○ | ○ | ○ |
| | | Combustion test (vertical flame propagation combustion) | ○ | ○ | ○ | ○ | ○ | ○ |

TABLE 5

| | | | Comparative Example 1 | Comparative Example 2 | Comparative Example 3 | Comparative Example 4 | Comparative Example 5 |
|---|---|---|---|---|---|---|---|
| Composition | Base resin | PE1 | 97 | 97 | 97 | 97 | 97 |
| | Silicone MB | Silicone MB1 | | 6 | 6 | 6 | 6 |
| | Fatty acid metal salt | Fatty acid metal salt 1 | 5 | | 5 | 5 | 5 |
| | Flame retardant agent | Calcium carbonate particles | 50 | 50 | | 50 | 50 |
| | Hindered phenol | Hindered phenol A | 0.2 | 0.2 | 0.2 | | 0.2 |
| | Hindered amine | Hindered amine A (N-alkyl type) | 0.5 | 0.5 | 0.5 | 0.5 | |
| | | Hindered amine B (N-alkyl type) | | | | | |
| | | Hindered amine C (N-alkylene type) | | | | | |
| | | Hindered amine D (N-alkoxy type) | | | | | |
| | | Hindered amine E (N-alkyl type) | | | | | |
| | | Hindered amine F(N—H type) | | | | | |
| | Benzotriazole | | | | | | |
| Property | Weather resistance | Retention of tensile elongation (%) after UV irradiation for 100 h | 99 | 100 | 92 | 5 | 0 |
| | Flame retardancy | Combustion test (horizontal combustion) | X | X | X | ◯ | ◯ |
| | | Combustion test (60° inclined combustion) | X | X | X | ◯ | ◯ |
| | | Combustion test (vertical flame propagation combustion) | X | X | X | ◯ | ◯ |

| | | | Comparative Example 6 | Comparative Example 7 | Comparative Example 8 | Comparative Example 9 |
|---|---|---|---|---|---|---|
| Composition | Base resin | PE1 | 97 | 97 | 97 | 97 |
| | Silicone MB | Silicone MB1 | 6 | 6 | 6 | 6 |
| | Fatty acid metal salt | Fatty acid metal salt 1 | 5 | 5 | 5 | 5 |
| | Flame retardant agent | Calcium carbonate particles | 50 | 50 | 50 | 50 |
| | Hindered phenol | Hindered phenol A | 0.2 | 0.2 | 0.2 | 0.2 |
| | Hindered amine | Hindered amine A (N-alkyl type) | | | | |
| | | Hindered amine B (N-alkyl type) | | | | |
| | | Hindered amine C (N-alkylene type) | | | | |
| | | Hindered amine D (N-alkoxy type) | | | | |
| | | Hindered amine E (N-alkyl type) | | | | |
| | | Hindered amine F(N—H type) | 0.5 | 3 | | |
| | Benzotriazole | | | | 0.5 | 3 |
| Property | Weather resistance | Retention of tensile elongation (%) after UV irradiation for 100 h | 1 | 20 | 2 | 5 |
| | Flame retardancy | Combustion test (horizontal combustion) | ◯ | X | ◯ | X |
| | | Combustion test (60° inclined combustion) | X | X | X | X |
| | | Combustion test (vertical flame propagation combustion) | X | X | X | X |

[Evaluation of Properties]

For the insulated wires of Examples 1 to 38 and Comparative Examples 1 to 9 obtained as described above, evaluations of flame retardancy and weather resistance were performed as described below.

<Flame Retardancy>

(1) Horizontal Combustion Test

Horizontal combustion test according to JIS C3005 was performed for the insulated wires of Examples 1 to 38 and Comparative Examples 1 to 9, and the flame retardancy was evaluated. Specifically, ten insulated wires were prepared for each Example and Comparative Example, and the flame retardancy test was performed. Contact with flame was performed until the wire starts to burn within 30 seconds. The results are shown in Tables 1 to 5. Meanwhile, in Tables 1 to 5, when all of the ten wires showed self-extinguishment, it was described as "○". When all of the ten wires did not show self-extinguishment, it was described as "x".

(2) Inclined Combustion Test

60° inclined combustion test according to JIS C3005 was performed for the insulated wires of Examples 1 to 38 and Comparative Examples 1 to 9, and the flame retardancy was evaluated. Specifically, ten insulated wires were prepared for each Example and Comparative Example, and the flame retardancy test was performed. At this time, contact with flame was performed until the wire starts to burn within 30 seconds. The results are shown in Tables 1 to 5. Meanwhile, in Tables 1 to 5, when all of the ten wires showed self-extinguishment, it was described as "O". When all of the ten wires did not show self-extinguishment, it was described as "x".

(3) Vertical Flame Propagation Test

Vertical flame propagation test according to JIS C3665 was performed for the insulated wires of Examples 1 to 38 and Comparative Examples 1 to 9, and the flame retardancy was evaluated. The results are shown in Tables 1 to 5. Furthermore, in Tables 1 to 5, when self-extinguishment was exhibited and the length between the bottom end of a upper supporting material, which supports the insulated wire from the top, and the end point of carbonization is within 50 to 540 mm, it was described as "O". When self-extinguishment was not exhibited and the length was not within the range, it was described as "x".

(4) Evaluation

Among the above (1) to (3), if the insulated wires pass (1) Horizontal combustion test, they were determined to be "pass" in term of the flame retardany.

<Weather Resistance>

By pressing the resin composition of Examples 1 to 38 and Comparative Examples 1 to 9 under a pressure at 160° C.×5 minutes, a sheet sample with a thickness of 1 mm was obtained. After that, punching was performed by using a dumbbell-shaped punching blade of JIS K 6251 3 type to prepare a dumbbell-shaped test specimen. The resulting specimen was irradiated with ultraviolet rays (UV rays) for 100 hours by using a metal halide lamp type light resistance tester (manufactured by IWASAKI ELECTRIC CO., LTD., EYE Super UV Tester "model: SUV-W13", illuminance: 70 mW/cm$^2$). After that, the test specimen was subjected to a tensile test based on JIS K7350 and the retention of tensile elongation was measured. The results are shown in Tables 1 to 5. Meanwhile, in Tables 1 to 5, if the retention of tensile elongation is 50% or less, it was determined to be "fail" in terms of weather resistance. On the other hand, if the retention of tensile elongation is more than 50%, it was determined to be "pass" in terms of weather resistance.

According to the results shown in Tables 1 to 5, it was found that the insulated wires of Examples 1 to 38 satisfy the pass requirements of both the flame retardancy and weather resistance. In contrast, the insulated wires of Comparative Examples 1 to 9 did not satisfy at least one of the pass requirements of the flame retardancy and weather resistance.

From the above, it was confirmed that, according to the flame resin composition of the invention, the weather resistance can be improved while securing excellent flame retardancy.

EXPLANATIONS OF LETTERS OR NUMERALS

1 . . . Internal conductor (transmission medium)
2 . . . Insulator
3 . . . Sheath
4 . . . Insulated wire
10 . . . Cable
20 . . . Optical fiber cable (cable)
24 . . . Optical fiber (transmission medium)
25 . . . Sheath

The invention claimed is:

1. A flame retardant resin composition comprising:
a base resin containing a polyolefin based compound;
a silicone based compound;
a fatty acid metal salt;
a flame retardant agent containing at least one kind selected from the group consisting of calcium carbonate particles and silicate compound particles;
a hindered phenol based compound; and
a hindered amine based compound,
wherein the silicone based compound is blended at a ratio of 0.1 part by mass or more and 10 parts by mass or less relative to 100 parts by mass of the base resin,
the fatty acid metal salt is blended at a ratio of 0.1 part by mass or more and 20 parts by mass or less relative to 100 parts by mass of the base resin,
the flame retardant agent is blended at a ratio of 5 parts by mass or more and 200 parts by mass or less relative to 100 parts by mass of the base resin,
the hindered phenol based compound is blended at a ratio of 0.05 part by mass or more and 10 parts by mass or less relative to 100 parts by mass of the base resin,
the hindered amine based compound is blended at a ratio of 0.05 part by mass or more and 10 parts by mass or less relative to 100 parts by mass of the base resin, and
the hindered amine based compound has a monovalent group represented by the following formula (1):

[Chem. 1]

(1)

(in the formula (1), $R^1$ represents an alkyl group or alkoxy group having 1 to 30 carbon atoms and $R^2$ to $R^5$ each independently represent an alkyl group having 1 to 6 carbon atoms)

(2)

2. The flame retardant resin composition according to claim 1, wherein the flame retardant agent is composed of calcium carbonate particles.

3. The flame retardant resin composition according to claim 1, wherein the flame retardant agent is composed of silicate compound particles.

4. The flame retardant resin composition according to claim 1, wherein the hindered amine based compound has a monovalent group represented by the formula (1).

5. The flame retardant resin composition according to claim 1,
wherein the silicone based compound is blended at a ratio of more than 0.2 part by mass relative to 100 parts by mass of the base resin,
the fatty acid metal salt is blended at a ratio of more than 3 parts by mass relative to 100 parts by mass of the base resin,
the hindered amine based compound is blended at a ratio of 0.05 part by mass or more and less than 1 part by mass relative to 100 parts by mass of the base resin, and
the hindered amine based compound has a molecular weight of 1000 or more.

6. The flame retardant resin composition according to claim 1, wherein the hindered amine based compound has a molecular weight of 1000 or more.

7. The flame retardant resin composition according to claim 6, wherein the hindered amine based compound has a molecular weight of 3000 or less.

8. The flame retardant resin composition according to claim 5,
wherein the silicone based compound is blended at a ratio of more than 1 part by mass relative to 100 parts by mass of the base resin, and
the hindered amine based compound has a monovalent group represented by the formula (1) and $R^1$ in the formula (1) represents the alkyl group.

9. A cable comprising:
a sheath; and
a transmission medium provided on the inner side of the sheath and composed of a conductor or an optical fiber,
wherein the sheath is composed of the flame retardant resin composition according to claim 1.

10. A flame retardant resin composition comprising:
a base resin containing a polyolefin based compound;
a silicone based compound;
a fatty acid metal salt;
a flame retardant agent containing at least one kind selected from the group consisting of calcium carbonate particles and silicate compound particles;
a hindered phenol based compound; and
a hindered amine based compound,
wherein the silicone based compound is blended at a ratio of 0.1 part by mass or more and 10 parts by mass or less relative to 100 parts by mass of the base resin,
the fatty acid metal salt is blended at a ratio of 0.1 part by mass or more and 20 parts by mass or less relative to 100 parts by mass of the base resin,
the flame retardant agent is blended at a ratio of 5 parts by mass or more and 200 parts by mass or less relative to 100 parts by mass of the base resin,
the hindered phenol based compound is blended at a ratio of 0.05 part by mass or more and 10 parts by mass or less relative to 100 parts by mass of the base resin,
the hindered amine based compound is blended at a ratio of 0.05 part by mass or more and 10 parts by mass or less relative to 100 parts by mass of the base resin,
the hindered amine based compound has a molecular weight of 3000 or less and
the hindered amine based compound has a monovalent group represented by the following formula (2):

(2)

(in the formula (2), $R^6$ represents an alkylene group having 1 to 30 carbon atoms and $R^7$ to $R^{10}$ each independently represent an alkyl group having 1 to 6 carbon atoms).

11. A cable comprising:
a sheath; and
a transmission medium provided on the inner side of the sheath and composed of a conductor or an optical fiber,
wherein the sheath is composed of the flame retardant resin composition according to claim 10.

* * * * *